(12) United States Patent  
Moreira

(10) Patent No.: US 8,330,407 B2  
(45) Date of Patent: Dec. 11, 2012

(54) ELECTRONIC SYSTEM AND PROTECTION METHOD FOR ELECTRIC MOTORS

(75) Inventor: Raphael Garcia Moreira, Pirituba (BR)

(73) Assignee: Bitzer Compressores Ltda, Cotia/SP (BR)

( * ) Notice: Subject to any disclaimer, the term of this patent is extended or adjusted under 35 U.S.C. 154(b) by 335 days.

(21) Appl. No.: 12/644,914

(22) Filed: Dec. 22, 2009

(65) Prior Publication Data

US 2011/0149446 A1  Jun. 23, 2011

(51) Int. Cl.
*H02H 3/04* (2006.01)

(52) U.S. Cl. ........ 318/490; 318/491; 318/492; 318/493; 318/494

(58) Field of Classification Search .............. 318/490, 318/491–494
See application file for complete search history.

(56) References Cited

U.S. PATENT DOCUMENTS

| | | | | |
|---|---|---|---|---|
| 5,502,611 A | * | 3/1996 | Rodgers | 361/85 |
| 6,104,177 A | * | 8/2000 | Fritsch et al. | 323/300 |
| 7,378,821 B2 | * | 5/2008 | Simpson, III | 323/205 |
| 7,420,343 B2 | * | 9/2008 | Cook | 318/430 |

* cited by examiner

*Primary Examiner* — Walter Benson  
*Assistant Examiner* — David Luo  
(74) *Attorney, Agent, or Firm* — Volpe and Koenig, P.C.

(57) ABSTRACT

An electronic protection system for motors is provided that includes electric current ($SC_{1-n}$) sensor elements, more specifically Hall positioning sensors, and electronic circuits for electric tension reading. The signals are processed by a central processor (2) that executes a set of rules (A, B, C) and makes inferences based on the collected data in order to protect the motor (M, M') against possible failure. Furthermore, a method to protect motors (M, M') is provided, based on a set of rules (A, B, C) in order to characterize failures and trends of possible failures, so that the motor does not operate out of its specification for the system to deactivate it.

5 Claims, 11 Drawing Sheets

ELECTRONIC SYSTEM AND PROTECTION METHOD FOR ELECTRIC MOTORS

FIELD OF INVENTION

The present invention refers to an electronic system and a method whose main objective is to protect electric motors and, more specifically, a monitoring system, a set of rules and a processing core which makes inferences in order to protect the motor from overloads and possible electric failures, and also identifies them.

BACKGROUND

The current protection systems for electric motors are based on a set of devices developed to detect failures that may harm the electric features of motors. Among these, we can mention the most widely used systems in industrial facilities, as follows:

Overload relays: overloads are caused by blocked rotors, high frequency of maneuvers, long starts, requests above the established design limit, lack of phase and variations in tension and frequency. Such safety devices may be based on two different principles: a) bimetal overload relay, with one relay located in each feed phase of the motor, each one of them constituted of a pair of metal blades, said blades made of metals with different linear thermal dilatation coefficients, and of a firing device contained in an insulated pack with high thermal resistance; and b) electronic overload relay, which is constituted of an electronic circuit that actuates on the system due to a correlated temperature value versus resistance, whose resistance is a function of a temperature sensor coupled to the motor stator and that has a characteristic curve, wherein the electronic system converts said value output from the sensor and actuates on the system due to the temperature.

Circuit breaker: these are partly constituted of an overload relay and a coil system per phase. When an electric current determined by the coil passes, it, actuates the mechanical system to flip the contacts of the circuit breaker and cut the current flow.

Fuses: these are based on the principle that the current passing through the conductor generates heat inside, proportional to the square of its intensity, according to Joule's integral. Based on this principle, the conductor inside the fuse is dimensioned so that, under a given current level, the heat transmission effect occurs near the adiabatic system, causing the rupture of said internal conductor by melting, thus interrupting the current flow in the phase where it is installed. The main disadvantage of this system is that it does not interrupt all the phases involved in the system, but just the one where the overload occurred, and the interruption of a phase will, in fact, cause a lack of phase.

Phase-loss relays: these are used to ensure that the motor only works in the presence of electric tension in all its electric doors. Phase-loss relays are usually installed before the maneuver element, usually called contactor, and, without tension in any phase, they cut feeding to the motor.

One of the problems connected to the use of phase-loss relays is its location in relation to the motor, i.e. before the contactors. In this case, and in case of failure in any of the contactors, the phase-loss relays will continue to identify the presence of feeding tension in all phases, thus not detecting the contactor failure and therefore hampering motor protection.

Another problem concerning phase-loss relays is the fact that users frequently do not use relays that present a circuit that compares discrepancy angles between the phases to ensure the correct symmetry between the phases. As known, when there is lack of phase, a tension is induced in it. Said tension is close to the nominal tension and is proportional to the inertia of the motor and the power used by it. Therefore, such tension induced in the phase with problems may "deceive" the phase-loss relay, compromising motor operation. To overcome said inconvenience, there are relays that, by means of a complex circuitry, analyze phase discrepancy angles between the phases; however, said circuits substantially increase cost of said protection systems.

The protection systems above have, besides the features individually explained, a common disadvantage. Since all the above systems are based on the identification of a temperature increase somewhere in the motor/circuit, in certain situations, these systems are slow to respond, due to the process of heat transfer between the parts. Thus, the maximum limits of current or temperature, regarding its insulation class, may be exceeded due to the slow response from said safety devices. Particularly, there are specific applications where the measurement of temperature is fully compromised, for example in refrigeration systems. In these applications, the motor incorporated to the compression system is exposed to low temperature gases that come from the refrigeration system, which in turn make the sensors respond to the low temperature gases and not to the real motor temperature. As a consequence, the motor may be operating at high currents, but the heat is transferred to the gas before causing variations in the sensor response.

Finally, there are problems caused by the low quality of the energy supplied to the electric motor, particularly in the presence of harmonics in the feeding tension of the motor and of harmonics in the motor current. Harmonics may cause severe damage to the motor, such as overheating, pulsing torques, motor speed variation, etc. Another serious problem caused by harmonics is due to the fact that, in certain cases, one wants to correct the power factor, but, when capacitors are put in parallel with the motor, there is a considerable possibility that such capacitor enters into resonance with some harmonic component of the system, which may cause severe damage to the motor and to other electric supply loads.

SUMMARY

In one aspect, the present disclosure is directed to an electronic system to protect electric motors. The system includes a plurality of sensors and a plurality of rules to evaluate currents and tensions measured in the motor. Tension sensors are placed before a contactor and current sensors are Hall effect type sensors and are located between the contactor and feeding terminals of the motor.

The present disclosure is also directed to a method to protect electric motors, particularly for three-phase electric motors. The method includes the application of a plurality of rules, in particular: a. rules related to motor start; b. rules related to motor operation; and c. rules related to motor turn-off.

BRIEF DESCRIPTION OF THE DRAWINGS

The present invention may be better understood with the detailed description that follows, given as a preferable way of realization and with reference to the attached figures, wherein.

DETAILED DESCRIPTION OF THE PREFERRED EMBODIMENTS

Introduction to the Embodiments

Figure 1A:
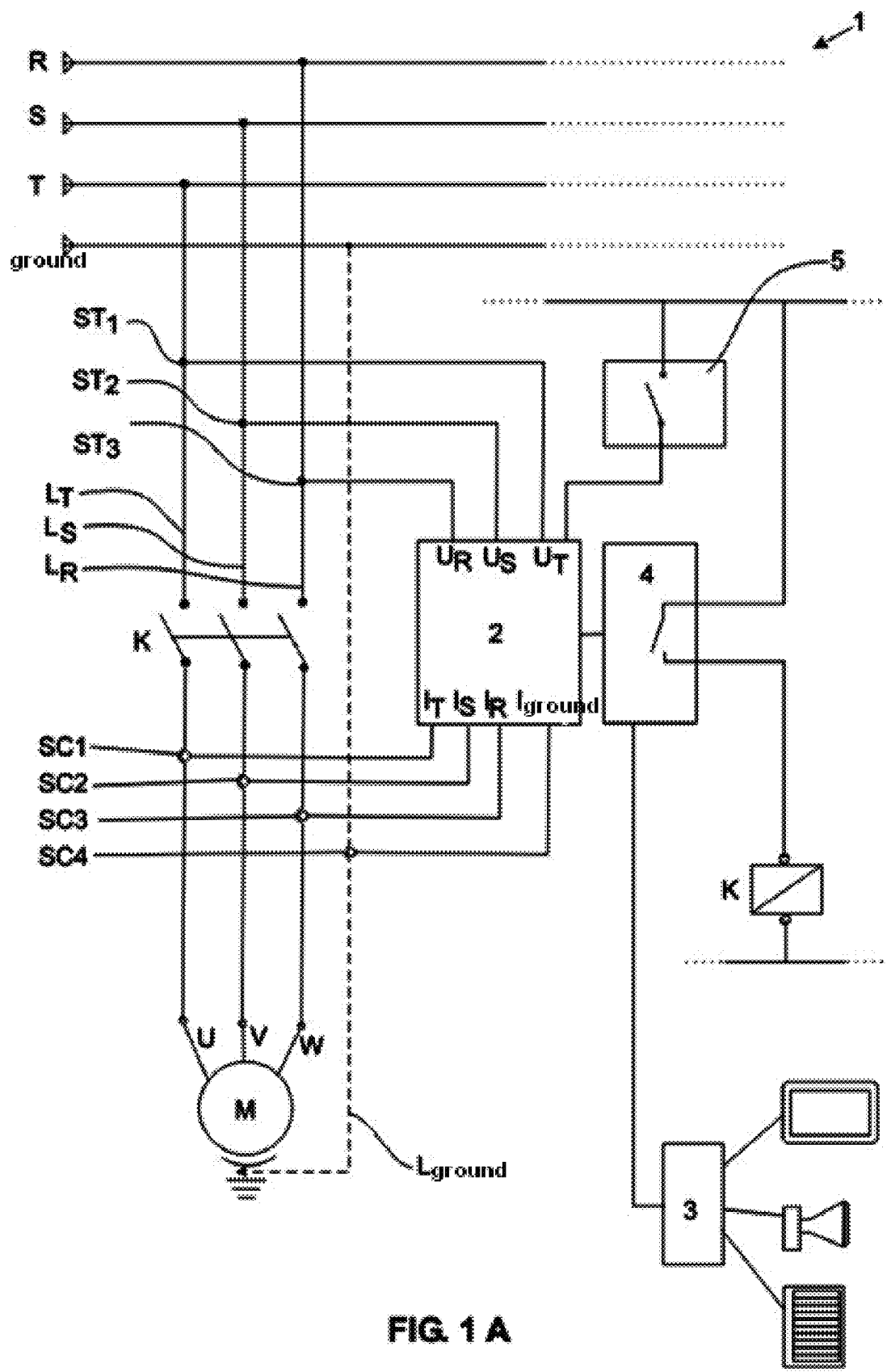
FIG. 1A shows a general connection scheme of the protection system mentioned in the present invention with a motor and its corresponding maneuver element.

The present disclosure is directed to a system and a method for the protection of electric motors, particularly three-phase induction electric motors that can overcome the inconveniences presented in the state of the art. The present disclosure is particularly directed to a system and a method for the protection of electric motors based on the control of parameters not subject to interferences from the environment where the motor is located, such as temperature.

An electronic protection system is provided for motors constituted of electric current sensor elements, more specifically Hall positioning sensors, and electric tension reading electronic circuits, whose signals are processed by a central processor that performs some of rules and makes inferences based on the collected data in order to protect the motor against possible failure.

Another aspect of the present disclosure is an electronic protection system for electric motors, where the motor is a three-phase electric motor, the system comprising: a number of sensors, where the tension sensors are located before the contactor and the current sensors are Hall-effect type sensors and are located between the contactor and the motor feeding terminals; a processor to perform the rules to evaluate the currents and tensions measured in the motor, from the readings made by sensors; a communication interface, connected to the processor, to present the results of the application of the rules; an actuation interface, connected to the processor, which acts on the contactor; wherein the rules comprise one or more among: A1. to detect feeding tension during the motor start procedure, in each of the feed phases, and to detect the motor feeding currents, in each of the feeding phases, and to present, by the communication interface, the tensions and currents detected; A2. to start the motor; A3. to detect start currents and compare said currents with the blocked rotor current; if any start current is higher than the blocked rotor current, to turn off the motor; B1. to identify an imbalance between the feeding phases from the currents; B2. to identify a current variation from the currents in relation to time; B3. to identify lack of phase, in any of the feeding phases, by determining a phase current equal to zero; B4. to identify an overload, in any feeding phase, by comparing each phase current with a threshold value for the currents; B5. to calculate mechanical torque of the motor from the currents and tensions and to present the torque value calculated; B6. to identify a harmonic distortion in the feeding from the currents and tensions; B7. to identify a power factor out of operation standards by calculating $\cos \phi$ and the power factor from the currents and tensions; and B8. to identify possible damage to motor from the determination of the escape current in the line, since, in steps B, if a given, calculated and/or measured parameter is not within a corresponding range of operation and/or above or below a given limit, the motor is turned off; C1. to detect a command to turn off the motor; C2. to turn off the motor relay; C3. to identify an undue actuation of the motor by determining a phase current different from zero; if any phase current is different from zero, set off an alarm and register said failure.

Another aspect of the present disclosure is a method to protect motors based on a set of rules to characterize failures and trends of possible failures, so that the motor does not necessarily get to operate out of specification for the system object of the present invention to deactivate it.

More specifically, and according to a first object of the present disclosure, by reading the electric current measured at the electric doors of the electric motor, it is possible to ensure that the motor operates only in the presence of all phases, without the problems previously mentioned. When a phase is interrupted, its electric current is also instantaneously interrupted, independently from the induced tension that arises at the terminal of the corresponding electric door where the failure occurred. In other words, the system verifies the presence of the three-phase electric tension at the inlet of the contactor before activating it and, after the verification, the contactor is released. If the current is suddenly cut at one of the phases, the system identifies the lack of phase and sends a signal to turn off the contactor. The system detects the lack of phase instantaneously when the current of one phase tends to zero Ampere.

According to a second object of the present disclosure, by reading the electric current measured at the electric doors of the electric motor, it is possible to ensure that the motor operates only below a maximum value defined for the electric current of the motor. By reading the RMS electric current in real time, the system turns off the contactor when a measured electric current, at least at one of the electric doors of the motor, is higher than the maximum operation current defined. This form of protection fully changes the current paradigm of most protection devices, where the heating of a given element of the protection device is expected to occur first, and only then the device cuts the feeding to the electric motor. Said conceptual change allows for better protection of motor components, since it controls the action (current) and not the reaction (heat). Therefore, the motor works below a maximum allowed torque, since the electric current and the mechanical torque are proportional according to the proportionality constants that consider the electric supply tension, among other factors that guarantee the correlation. Thus, the system includes an inlet to write a polynomial function, where the coefficients may be changed so to establish the correlation between the electric current and mechanical torque.

According to a third object of the present disclosure, by reading the electric current measured at the electric doors of the electric motor, it is possible to ensure that the protection system interrupts the operation of the electric motor due to the high start electric current. Hence, the start current is compared with a pre-established maximum current of blocked rotor. Since the protection system can measure the instantaneous current, in real time, if said maximum value is exceeded the system will act on the contactor to hinder its operation.

According to a fourth object of the present disclosure, by reading the electric current measured by the electric doors of the electric motor, it is possible to ensure that the motor is turned off by its maneuver element or contactor, when a high rate of current increase is detected in at least one of the electric doors of the motor, even if the current at the remaining doors remains constant or suffers a light increase. In other words, the present protection system for motors presents a maximum allowed $\Delta i/\Delta t$ parameter and, if the increase rate of the current is exceeded, the protection system sends a turnoff signal to the contactor to turn off the motor, even before the maximum operation current value is reached. In this case, the protection system "evaluates" that, with this high current increase rate, there may be a severe anomaly in the electric supply or even in the electric motor, such as a locked shaft, low insulation, etc.

According to a fifth object of the present disclosure, by reading the electric current measured at the electric doors of the electric motor, it is possible to ensure that the motor does not operate when a constant deviation between the electric currents measured at the electric doors of the motor is detected. In other words, the protection system acts on the contactor when it detects an imbalance between the feeding electric currents of the motor. Such imbalance is calculated according to norm IEC 34-1.

According to a sixth object of the present disclosure, by reading the electric current measured at the electric doors of the electric motor and the electric tensions of each door, it is possible to calculate $\cos \phi$ and the true power factor in which the motor operates. Also it is possible to enable the required capacitive reactive power value in a CAN protocol bar for the correction system to operate correctly, and it does not allow the motor to operate out of the power factor minimum and maximum limits.

According to a seventh object of the present disclosure, by reading the electric current measured at the electric doors of the electric motor and the electric tensions of each door, it is possible to calculate, by Fourier series decomposition, the harmonics present in the system both in electric currents and in three-phase electric tension, as well as the motor power factor. The protection system of the invention compares the values measured with the maximum values previously defined for the motor to which said protection system will be connected. If any of the limits is exceeded, the system acts on the contactor to turn it off, in order not to damage the electric supply where the motor is installed, or damage the motor itself due to harmonic effects, such as overheating, saturation, etc.

According to an eighth object of the present disclosure, by reading the electric current measured in the earth conductor of the motor, it is possible to detect the existence of escape currents, which may mean, among several possibilities, a decrease of the operational life of the motor, wear in the insulating resin in the stator, high humidity in the winding, etc.

DETAILED DESCRIPTION

Initially, it is important to highlight that, despite the fact that the present system is disclosed to protect a three-phase induction electric motor, other kinds of motors, fed by other types of electric supply, may also be controlled and protected by the system described herein.

According to the illustrations above, 1 indicates, as a whole, an electronic system and protection of electric motors. The electronic system 1 is basically composed of a processor 2, which receives the information coming from a number of sensors and that acts on the contactor K of the motor M. Examples of such a device include, without limitation: analogue devices, analogue computation modules; digital devices including, without limitation, small, medium and large scale integrated circuits, application-specific integrated circuits (ASICs) and programmable logic arrays (PLAs); digital computation modules including, without limitation, central processing units (CPUs), microcomputers, microprocessors, dedicated or non-dedicated microcontrollers and programmable logic controllers (PLCs). In a preferable embodiment of the invention, the processor 2 is selected between DSPs and DSCs. In another preferable embodiment of the invention, the processor 2 is a DSP with processing frequency above 120 MHz.

The motor M, in this case, is a three-phase electric induction motor, which is fed by lines $L_R$, $L_S$, $L_T$ and $L_{Earth}$ from a conventional three-phase electric supply (R, S, T, Earth). Between the electric supply (R, S, T, Earth) and the feeding terminals U, V and W of the motor M, it is installed a maneuver element or contactor K, known per se, which is able to turn on and off, simultaneously, the three feeding phases of the motor M, and, therefore able to turn on and off the motor M itself. The actuation of the contactor K is electronically controlled by the processor 2, as known in the art, and therefore does not require a detailed description. It is important to stress that the processor 2, preferably by an appropriate actuation interface 4, sends a first signal indicating the operation of the motor (on level) and another signal indicating the non-operation of the motor (off level) to the contactor K, wherein, in the first level (on) the contactor keys are closed and, in the second level (off), the keys are open, fully interrupting the feeding to the motor M. Preferably, the actuation interface 4 comprises or example, a relay that acts as a driver. More specifically, the processor saturates a transistor, which activates a small relay at the actuation interface 4, which finally activates the contactor K. Alternatively, an SCR, TRIAC, etc., could be used instead of the relay.

Furthermore, said processor 2 is connected to an external actuator 5, through which the operator informs the system of the need to operate the motor M. Alternatively, said start signal may originate from another electronic or electro-mechanical system, such as a timer, a pressure controller, a thermostat, a button or key, etc., which indicates, by an electric signal, the need to activate the motor M.

Between the electric supply (R, S, T, Earth) and the contactor K, tension sensors $ST_1$, $ST_2$ and $ST_3$ are placed, said sensors are able to determine the feeding tension supplied to the motor M, at each one of the feeding phases. Preferably, tension sensors $ST_1$, $ST_2$ and $ST_3$ are conventional tension reading circuits. There are no critical limitations regarding the type of tension sensor used in the present disclosure. Alternatively, and depending on the type of tension sensor used, appropriate interfaces may be included, to allow the connection and reading of data informed by sensors to the processor 2, as far as known by the state of the art. Said interfaces may comprise, among others, A/D converters, serial communication, etc.

Between the motor M and the contactor K, current sensors $SC_1$, $SC_2$, $SC_3$ and $SC_4$ are interposed, one for each phase and one for earth $L_{Earth}$. In a preferable embodiment of the invention, current sensors $SC_1$, $SC_2$, $SC_3$ and $SC_4$ are Hall-effect sensors, known in the art by their wide range of response and linearity, and reduced error.

In this case it is important to stress the location of the various current and tension sensors, respectively, before and after the contactor K. Said arrangement of sensors allows a more accurate analysis of the operational characteristics of the motor M (as will be explained in further detail below). Said arrangement of sensors makes the analysis more precise and offers a bigger volume of data than the ones supplied by the protection systems in the state of the art. In addition, the operation of the processor 2 directly on the contactor K, intermediated by the actuation interface 4, enables the motor to be disconnected from its feeding in the occurrence of a failure, or before an imminent failure, thus protecting and increasing the life of the motor, and possibly of the equipment connected to it (e.g. a condenser).

The processor 2 is also connected to a communication interface 3, which receives the information and indications coming from the processor 2 and converts them into visual, sound, written, etc. indications. In other words, when the processor 2 detects any failure in the operation of the motor M, particularly by activating any of the test routines, such failure is informed to the communication interface 3. The communication interface 3 receives the failure indication and sends information to the user of the failure that is causing the motor to be turned off, in the form of a written or symbolic indication on a display, or a sound signal produced by a sound alarm, or a light indication produced by a spy light or by any appropriate form that may allow the user to detect what caused the motor M to be turned off.

The communication interface 3 can also be used to provide the user with indications that are shown on a display regarding several parameters measured by the sensors $SC_4$, $SC_2$, $SC_3$, $SC_4$, $ST_1$, $ST_2$ and $ST_3$. In other words, the communication interface 3 may be configured to keep on the display the values of the currents $I_R$, $I_S$, $I_T$ and $I_{Earth}$ measured in lines $L_R$, $L_S$, $L_T$ and $L_{Earth}$, respectively, and the tension values of $U_R$, $U_S$ and $U_T$ measured in lines $L_R$, $L_s$ and $L_T$. Furthermore, the communication interface 3 can inform the user the results of the many calculations made by the processor 2, such as the value of the power factor, mechanical torque, etc.

In another aspect of the present invention, the measurements of current and tension, which arise from the above indicated arrangement of sensors $SC_1$, $SC_2$, $SC_3$ and $SC_4$, as well as $ST_1$, $ST_2$ and $ST_3$, respectively, and the qualification of these sensors, are submitted to a range of analytic rules that determine any incorrect operation parameters of the motor, and the possible failure hazards, thus increasing the protection of the motor.

Regarding said analytic rules and in order to make the description below more understandable and clear, said rules will be individually analyzed and in a preferable sequence of operation. However, it must be clear that the order of execution of each rule of analysis may be freely changed, unless indicated otherwise. Furthermore, the rules may be executed in parallel and simultaneously, or partially in parallel, except when one rule depends on the result of a previous one.

After the processor 2 receives an electric or electronic order for the operation of the motor 2, it begins to receive readings from a number of sensors located in the feeding circuit of the motor M, as indicated above, and to analyze said readings.

Figures 2, 3:
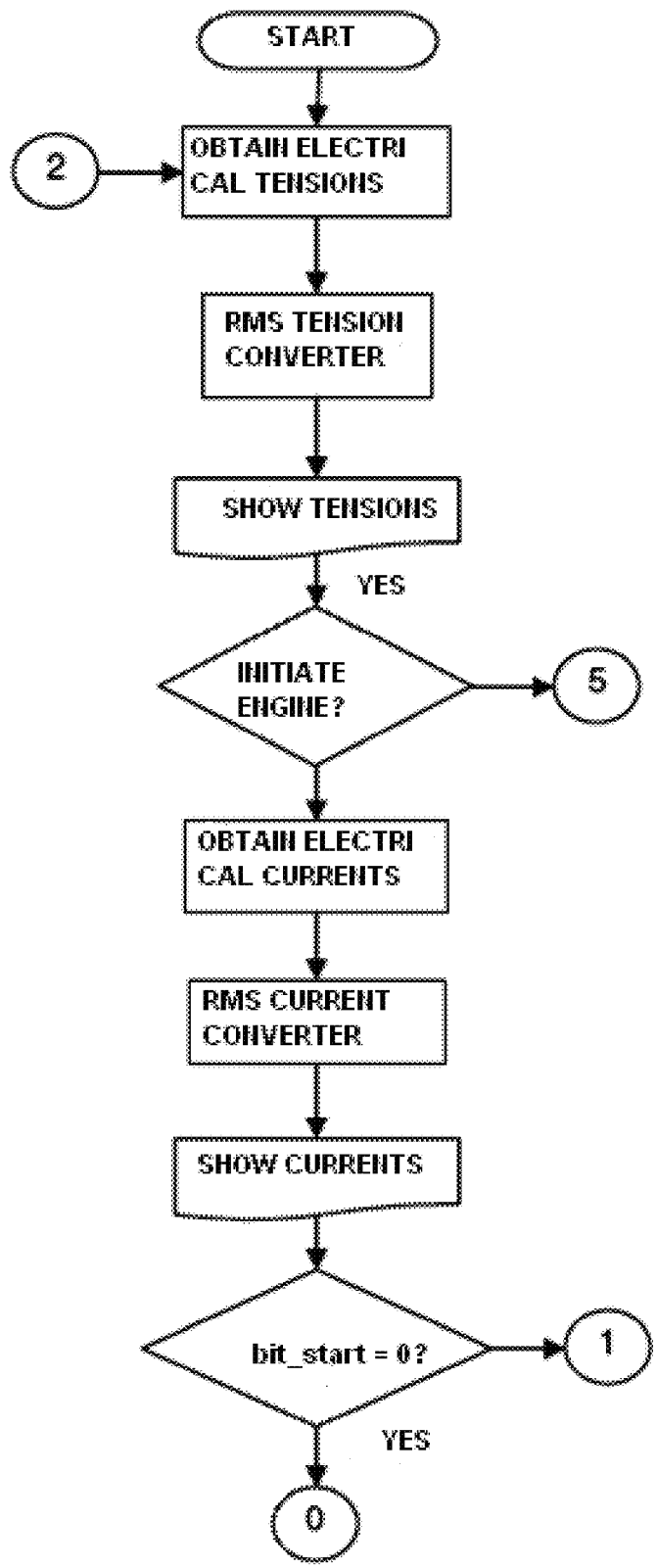
FIG. 2 shows the part of the algorithm that measures the tensions and electric currents and controls the operation of the motor.
FIG. 3 shows the part of the algorithm that actuates the turnoff of the motor.

Thus, the first test (start test) to be made is exactly the start of the motor. For this test, the processor 2 initially receives a start signal from the external actuator 5 and thus the system begins to receive the values measured for the tensions $U_R$, $U_S$ and $U_T$, measured in lines $L_R$, $L_s$ and $L_T$ and converts said values into RMS measurements. If there are no problems, the system then receives readings for the currents $I_R$, $I_S$ and $I_T$, measured in lines $L_R$, $L_s$ and $L_T$, and converts said readings into RMS currents. Since the motor is being started from a clear full stop position, the currents $I_R$, $I_S$ and $I_T$ will be necessarily equal to zero. Nevertheless, a start order may be given to the motor during a turnoff process, which will be disclosed below, and in this case, the currents $I_R$, $I_S$ and $I_T$ will not be equal to zero. FIG. 2 is a simplified schematic block view that shows the initial operation process of the protection system, where constant measurements of RMS tensions and also RMS currents are taken when the motor is in operation. These data are displayed in a communication interface 3. The system waits for clearance to start the motor.

FIG. 3 is a simplified schematic block view that shows the motor turnoff process when the system does not receive external authorization to start it.

Figure 4:
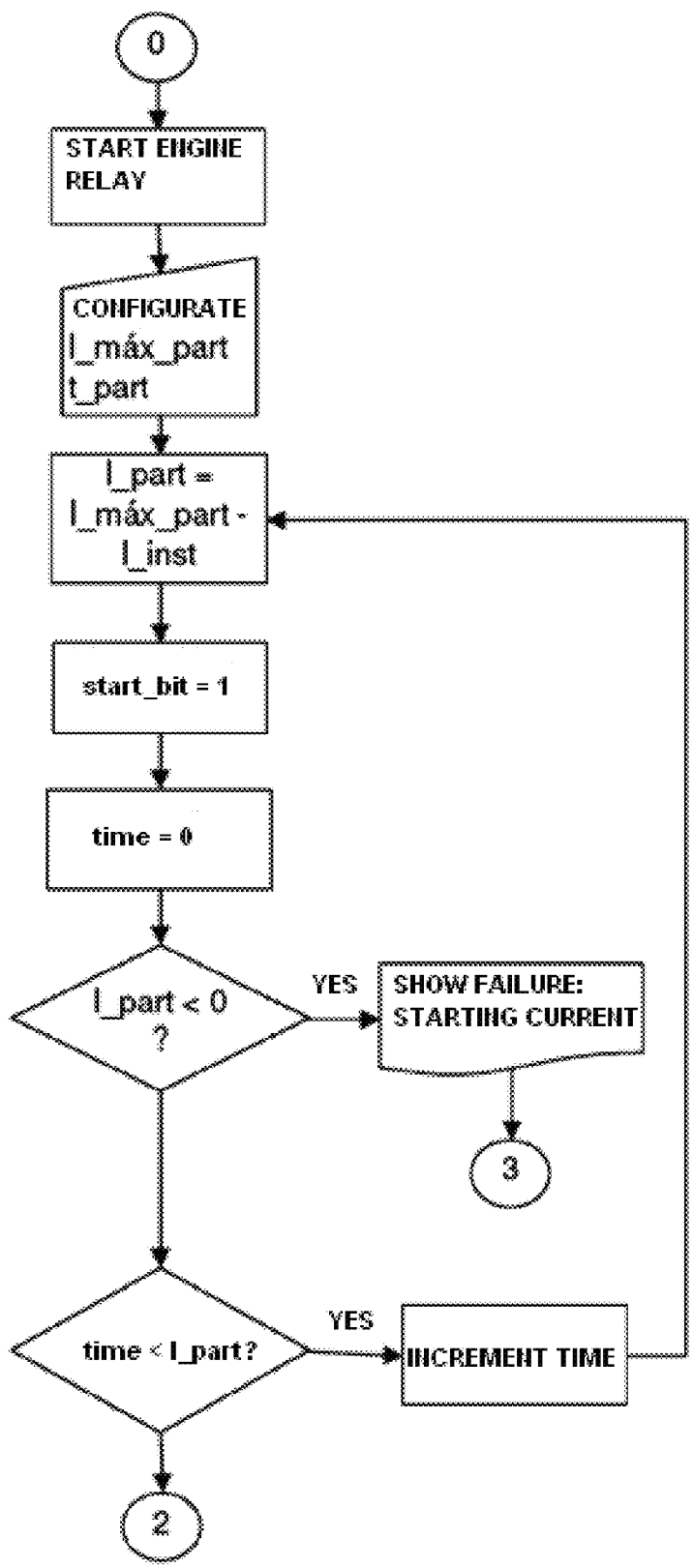
FIG. 4 shows the part of the algorithm that analyzes and controls the currents when the motor is started.

After the authorization to start the motor M is received, the relays/interface 4 of the motor are activated and sensors $SC_1$, $SC_2$ and $SC_3$ begin to inform the processor 2 of the readings for currents $I_R$, $I_S$ and $I_T$ measured in lines $L_R$, $L_S$ and $L_T$. FIG. 4 shows the motor start process and the analysis of peak currents during the expected start time. At the start of the motor M, if a peak of current is detected, i.e., a current value higher than a previously configured value $I_{max\ part}$ (locked rotor current), this will be interpreted as a situation of locked motor rotor and an alarm will be activated (by the communication interface 3) and the motor M will be immediately turned off by the protection system.

After the motor M start stage, the system begins to control a number of characteristics of the motor operation to prevent that any failure from either the motor or the feeding network compromises or damages the motor or any equipment connected to it.

Figure 5:
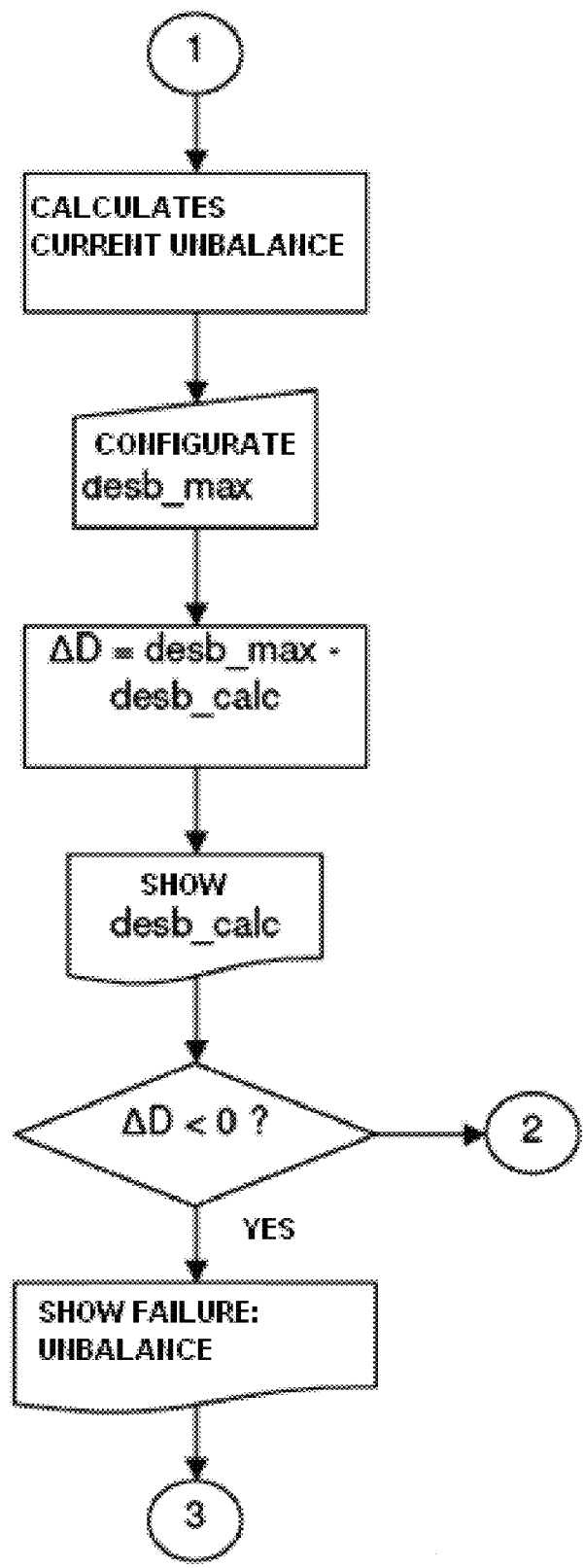
FIG. 5 shows the part of the algorithm that analyzes and controls the maximum allowed imbalance levels among the electric currents of each electric door of the motor.

Thus, the first characteristic to be analyzed, in the operation tests, is the possibility of imbalance. FIG. 5 shows the process to calculate imbalance (desb_calc) between the three-phase electric currents of the motor in accordance with the IEC 34-1 norm. The calculated value is compared with a maximum value established for the imbalance (desb_max) and, if said limit is exceeded, the system turns off the motor by way of the interface 4 that activates the contactor K and informs the failure to the communication interface 3. In accordance with the IEC 34-1 norm, the calculation of the imbalance (DSB) is given by the following equation:

$$DSB=100\times(0.5-(0.75(1-2(I_R^4+I_S^4+I_T^4)/(I_R^2+I_S^2+I_T^2)^2))^{0.5})^{0.5}(in\%)$$

Figure 6:
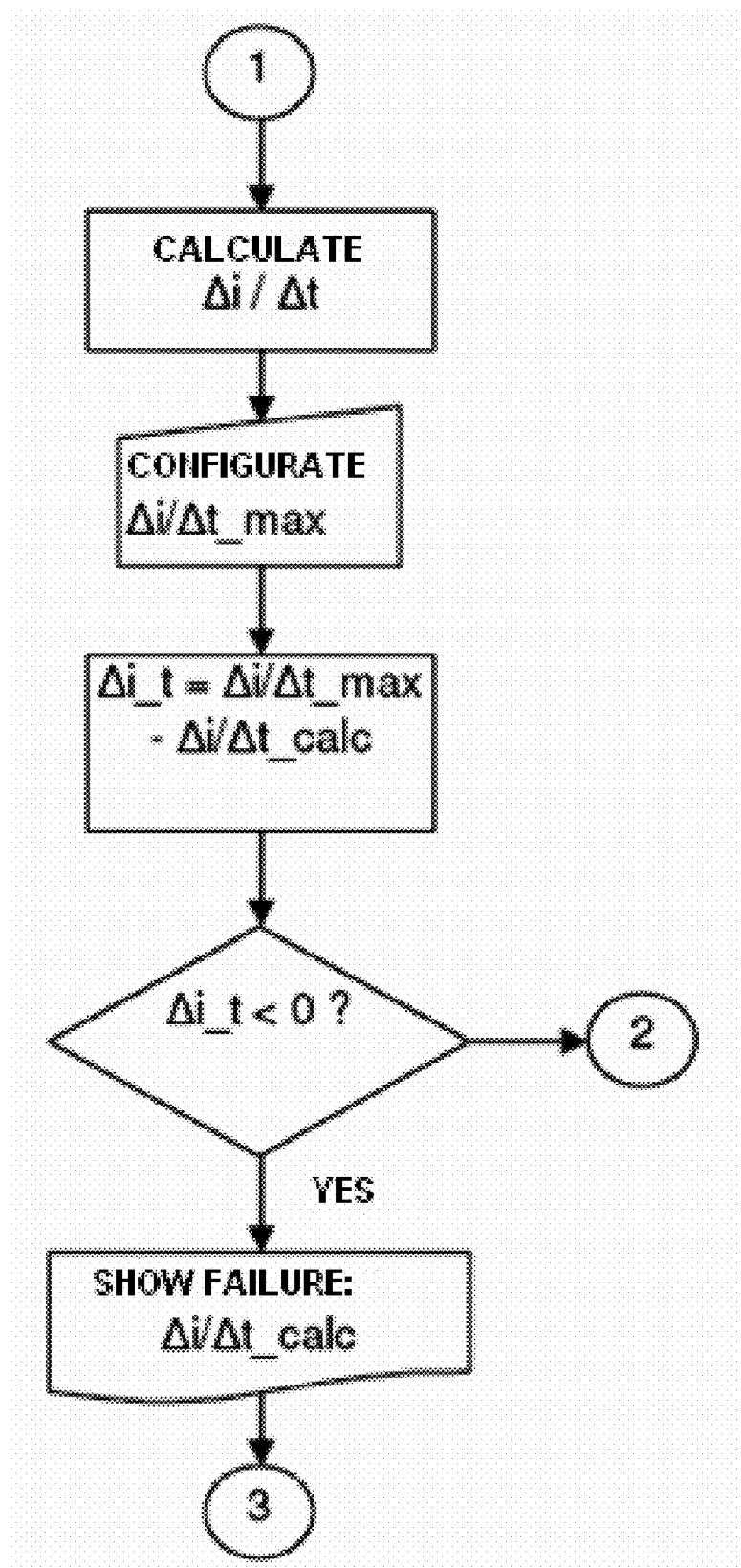
FIG. 6 shows the part of the algorithm that calculates and controls the maximum $\Delta i/\Delta t$ levels.

Still, regarding the operation tests, a second characteristic analyzed is the current fluctuation. FIG. 6 shows the process of calculation of $\Delta i/\Delta t$ in each current involved. The calculated $\Delta i/\Delta t$ value is compared with a maximum stipulated value and, if the maximum value is exceeded, the system immediately turns off the motor and informs the failure to the communication interface 3.

Figure 7:
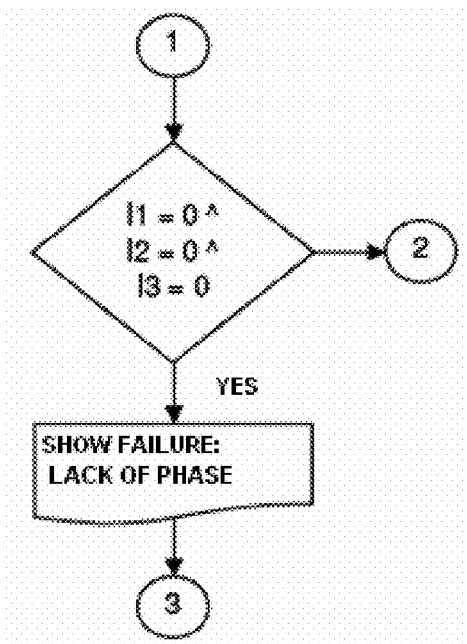
FIG. 7 shows the part of the algorithm that impedes the motor operation in case of lack of tension at one of its electric doors.

In another operation test, a third characteristic analyzed is the lack of phase. FIG. 7 shows the process that characterizes lack of phase. A lack of phase is characterized when two of the three currents $I_R$, $I_S$ and $I_T$, measured in lines $L_R$, $L_S$ and $L_T$, respectively connected to each electric door of the motor M, have an electric current which is higher than zero and only one of the three currents has a current value of zero. In this case, the system acts on the contactor K to turn off the motor M, also informing the failure to the communication interface 3.

Figure 8:
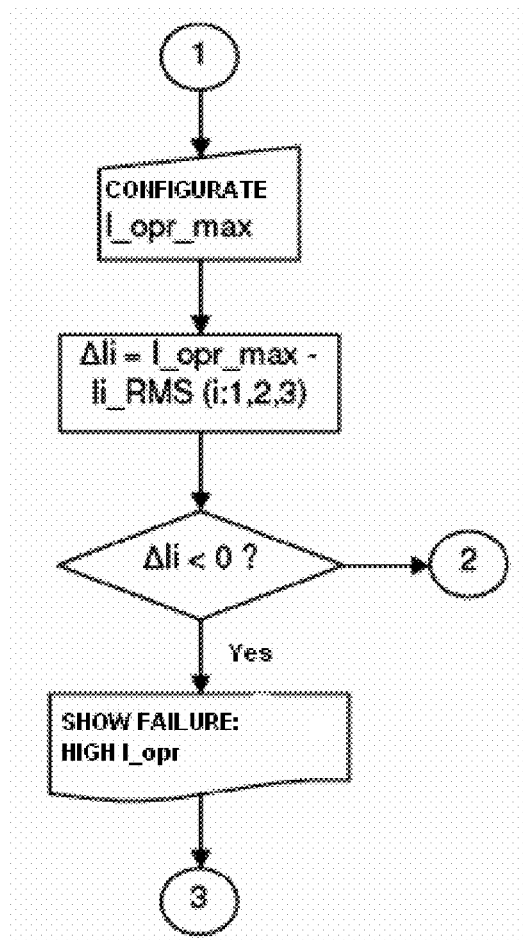
FIG. 8 shows the part of the algorithm that does not allow the motor to work above its maximum capacity limit.

In another operation test, an over current in the feeding of the motor M is analyzed. FIG. 8 shows the comparison process between each one of the electric currents $I_R$, $I_S$ and $I_T$ of the electric motor in operation, measured by sensors $SC_1$, $SC_2$ and $SC_3$ with a defined maximum current (l_opr_max). When the comparison concludes that one or more electric currents exceeds the maximum value previously set, the system turns off the motor M and informs the failure to the communication interface 3.

Figure 14:
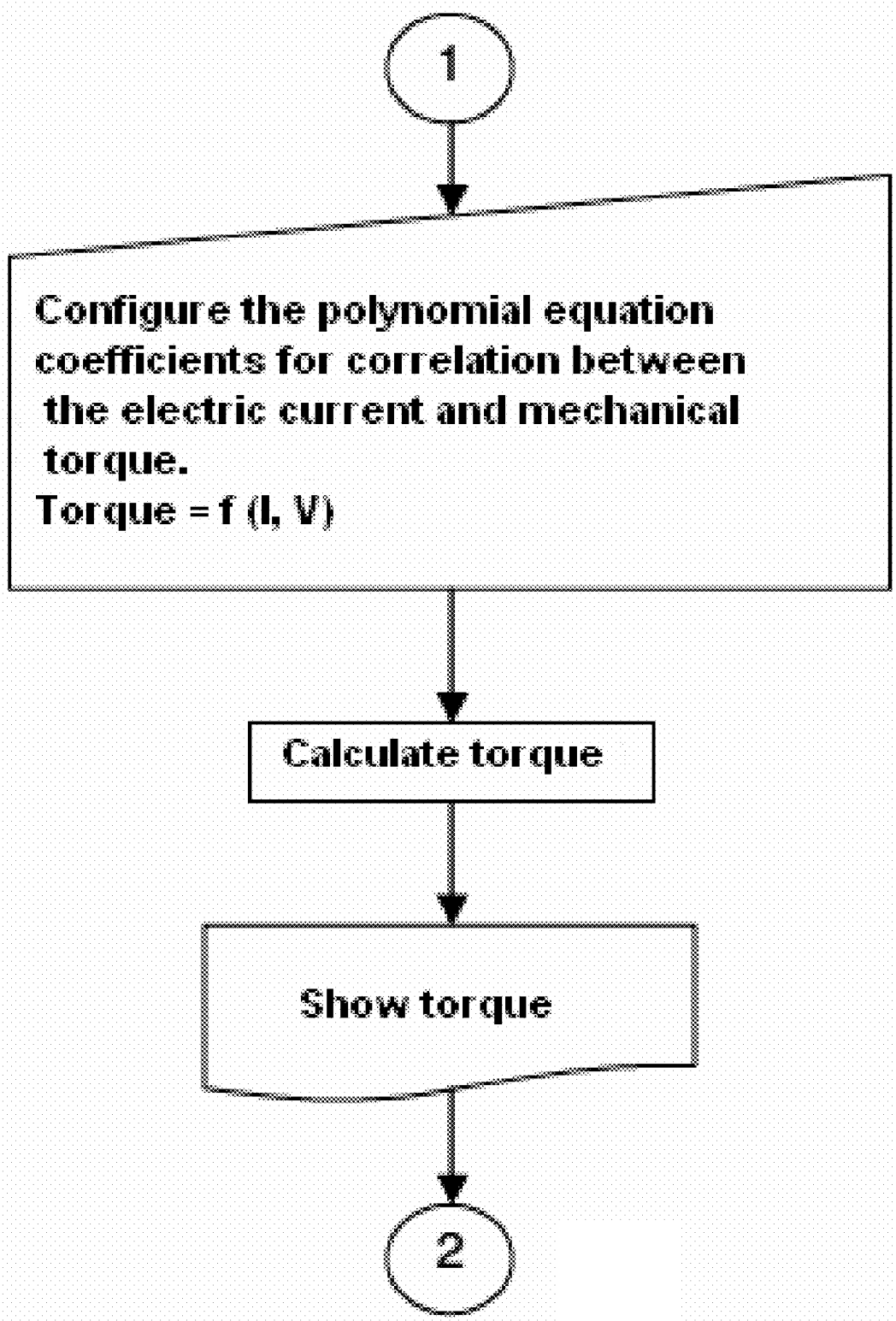
FIG. 14 shows the part of the algorithm to calculate the motor torque in relation to the current and the feeding tension.

One more operation test refers to the control of mechanical torque of the motor M. FIG. 14 shows the process to calculate and present the torque regarding current RMS and tension RMS, as well as the entry of data to configure the polynomial equation coefficients of up to the $9^{th}$ degree. Specifically, as known, the electric current and the mechanical torque are proportional by the proportionality constants, which take into consideration the tension of the electric supply and other factors. Therefore, the proportionality between current and torque is calculated by using a polynomial function of up to the $9^{th}$ degree whose coefficients are entered in the system (specifically in the processor 2 by the communication interface 3) according to the characteristics of the motor M. Thus, the system includes an inlet to write a polynomial function, where the coefficients may be changed in order to ensure the correlation between the electric current and mechanical torque. As a result, the communication interface 3 shows on the display the value as calculated for the mechanical torque.

Figure 9:
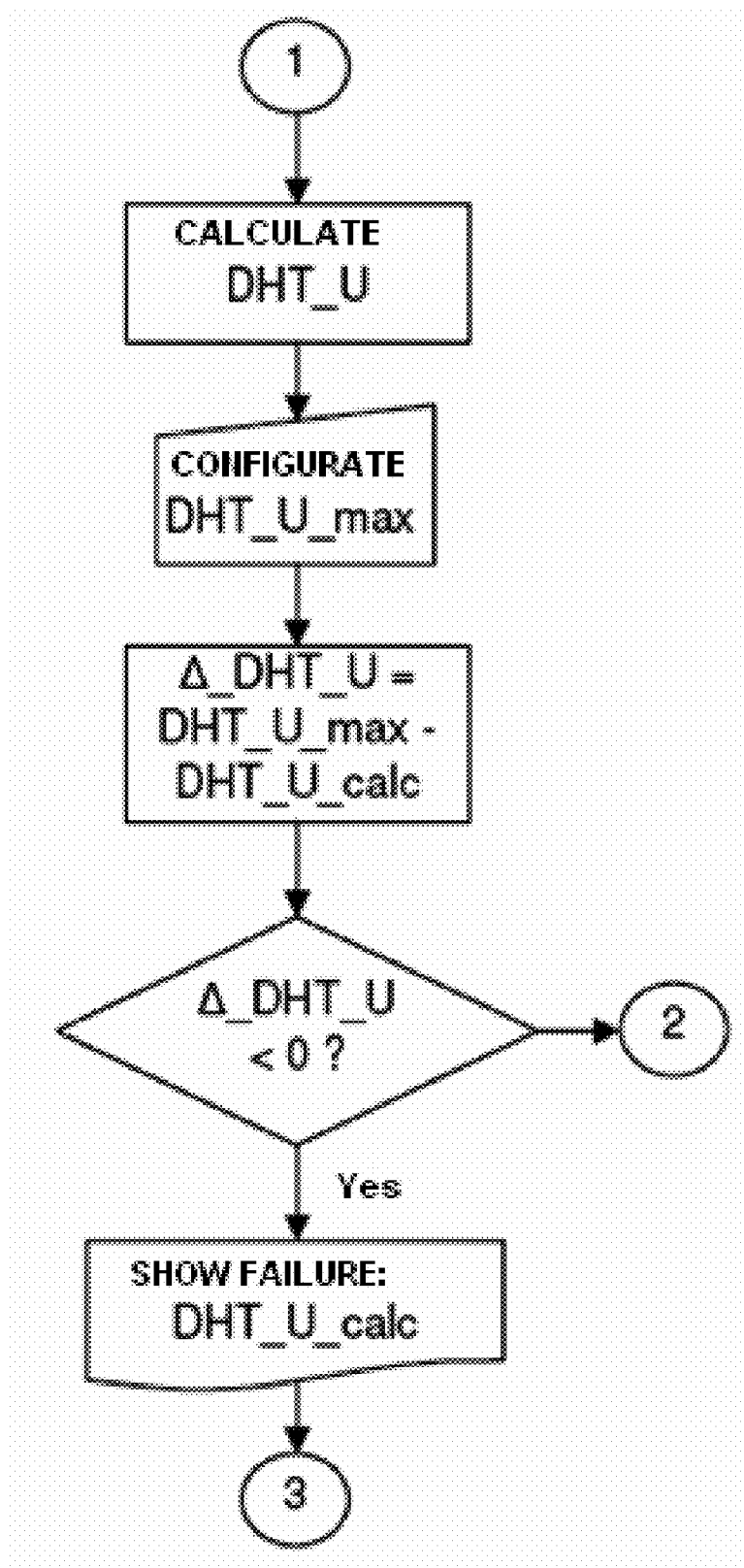
FIG. 9 shows the part of the algorithm that analyzes and controls the DHT levels in the tension delivered to the motor.

Another test refers to the presence of harmonic distortion in the feeding of the motor M. FIG. 9 shows the process to calculate the full harmonic distortion (DHT_U) of the three-phase electric tension that is applied to the electric doors of the motor. From currents $I_R$, $I_S$ and $I_T$ and tensions $U_R$, $U_S$ and $U_T$, the processor 2 decomposes the harmonic signals by the Fourier series and then calculates the rate of immunity or the harmonic tension level admissible to the motor, according to the IEC norm standards. This value is then analyzed and, if it exceeds the established maximum limits for the class of motor connected to the system, as previously configured, the system turns off the motor and informs the failure to the communication interface 3.

Figures 10, 11:
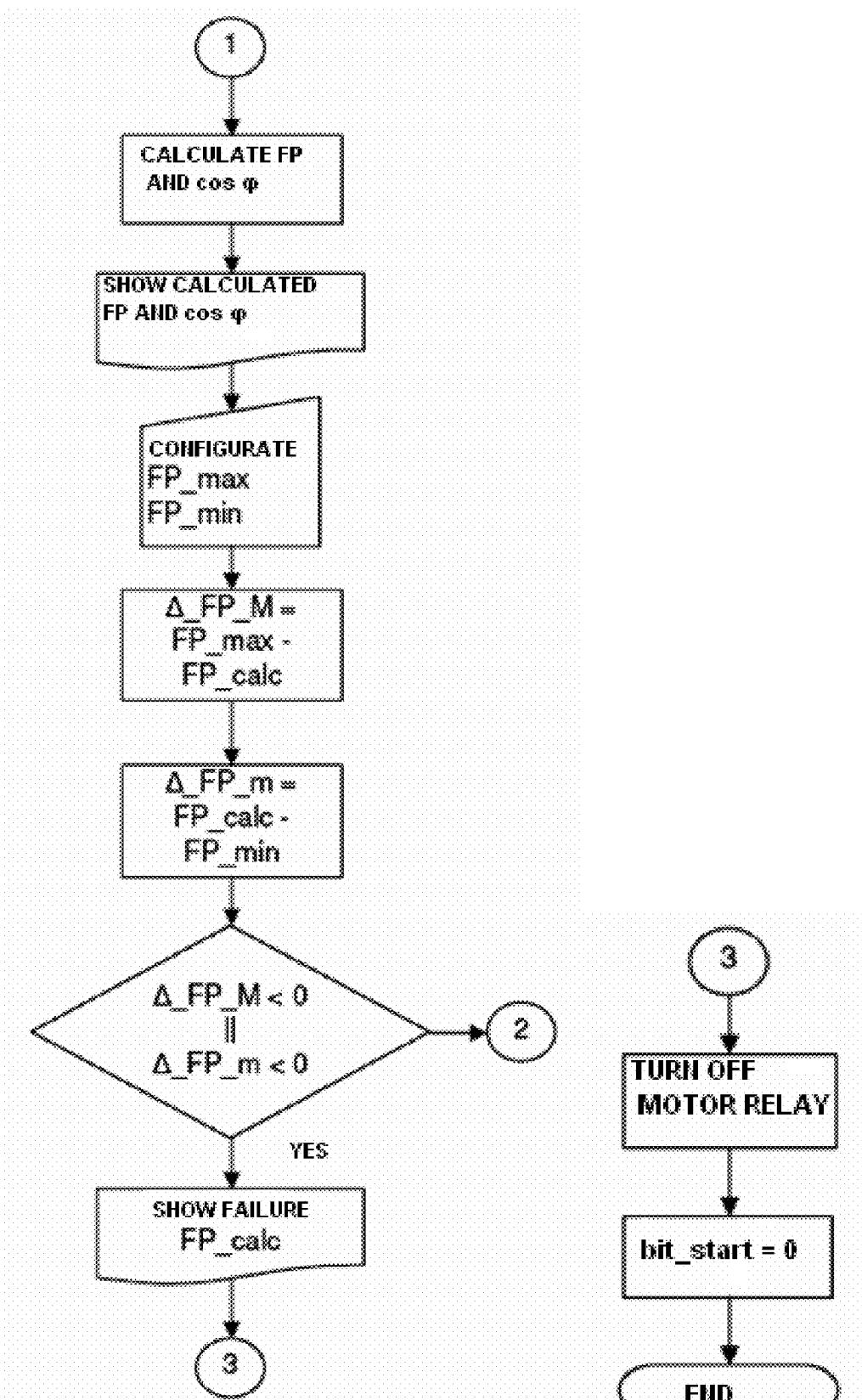
FIG. 10 shows the part of the algorithm that makes the analysis and control so that the motor does not operate out of the maximum and minimum limits for the power factor.
FIG. 11 shows the part of the algorithm that must be followed if any failure is detected in other processes.

One more test refers to the control of the motor power factor. FIG. 10 shows the process to calculate cos φ and the real power factor (FP) of the motor. The system informs the FP value in real time to the communication interface 3. Maximum and minimum values should be defined for the power factor so that, if the calculated power factor goes beyond any of the limits, the system turns off the motor and informs the data of the failure to the communication interface 3.

Figure 13:
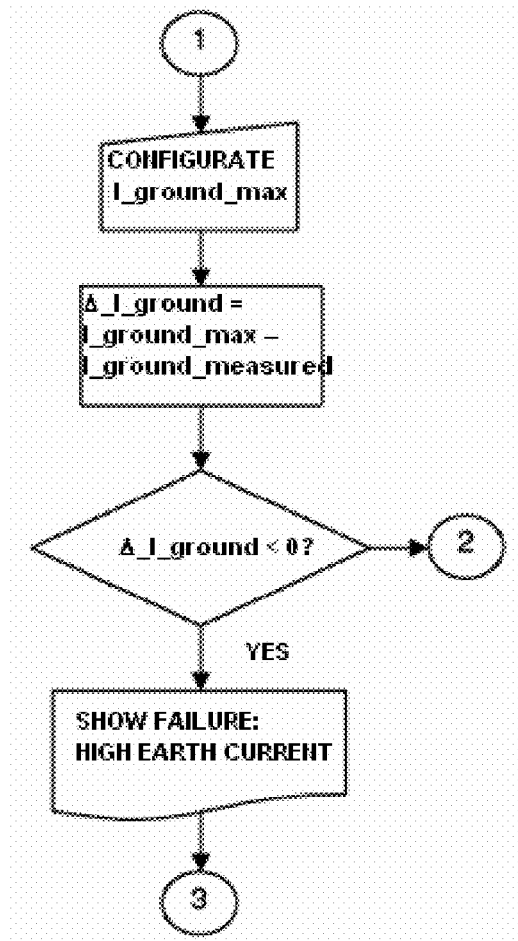
FIG. 13 shows the part of the algorithm to activate the alarm, when a current detected in the earth conductor of the motor is higher than the maximum established value.

A last operation test that is carried out by the system of the present invention refers to possible damage to the motor due to the presence of relevant current on line $L_{Earth}$. FIG. 13 shows the process of current measurement on the line $L_{Earth}$ that is connected to the motor M to ensure that the motor only works if the measured current (l_earth_measured) on that conductor is lower than a previously determined value (l_earth_max). The aim of said test is to control motor integrity, particularly regarding the shortening of motor life, wear of stator insulating resin, high humidity in winding, etc. Therefore, if said value goes beyond a previously defined limit, the system immediately turns off the motor.

For any of the hypotheses of motor 3 turnoff, the turnoff procedure is shown in FIG. 11, which is a simplified schematic block view that illustrates the motor turnoff process in case of failure.

Figure 12:
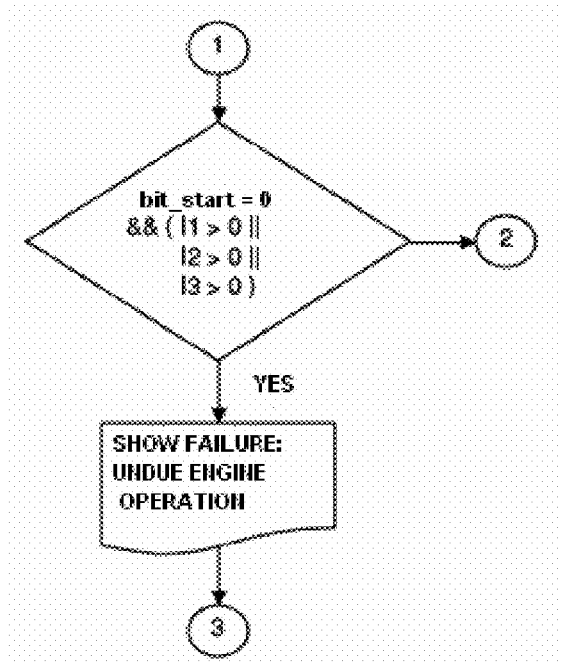
FIG. 12 shows the part of the algorithm that must be followed to activate the alarm, when the motor operates without having been activated by the electronic board, integrating part of the present invention.

As a result of these kinds of turnoff, or even of a regular turnoff of the motor M, problems may still occur and be controlled by the system of the present invention. Particularly, serious failure occurs when the motor is being turned off and, for some reason, motor turn-on process is unduly started. This may occur in two different forms, as follows: the first situation is when the external actuator 5 does not send a start signal to the system and in some way, the motor is externally started; the second situation occurs when the external actuator 5 sends the start motor signal to the system, and the system turns off the motor due to the detection of any of the possible failures that the system is designed to detect, and somehow the motor continues in operation or starts even if interface 4 inhibits its operation. FIG. 12 illustrates the process to characterize undue start of the motor by way of a start operation outside the system disclosed by the present invention. Such failure is characterized by the existence of a non-null current in any of the feeding lines of the motor. As a result of the presence of an undue current $I_R$, $I_S$ or $I_T$, measured in lines $L_R$, $L_S$ or $L_T$, respectively, the system of the present invention registers such incoherence in the system and informs it in the communication interface 3. In addition, the communication interface 3 also activates an alarm to indicate such anomalous situation.

Figure 1B:
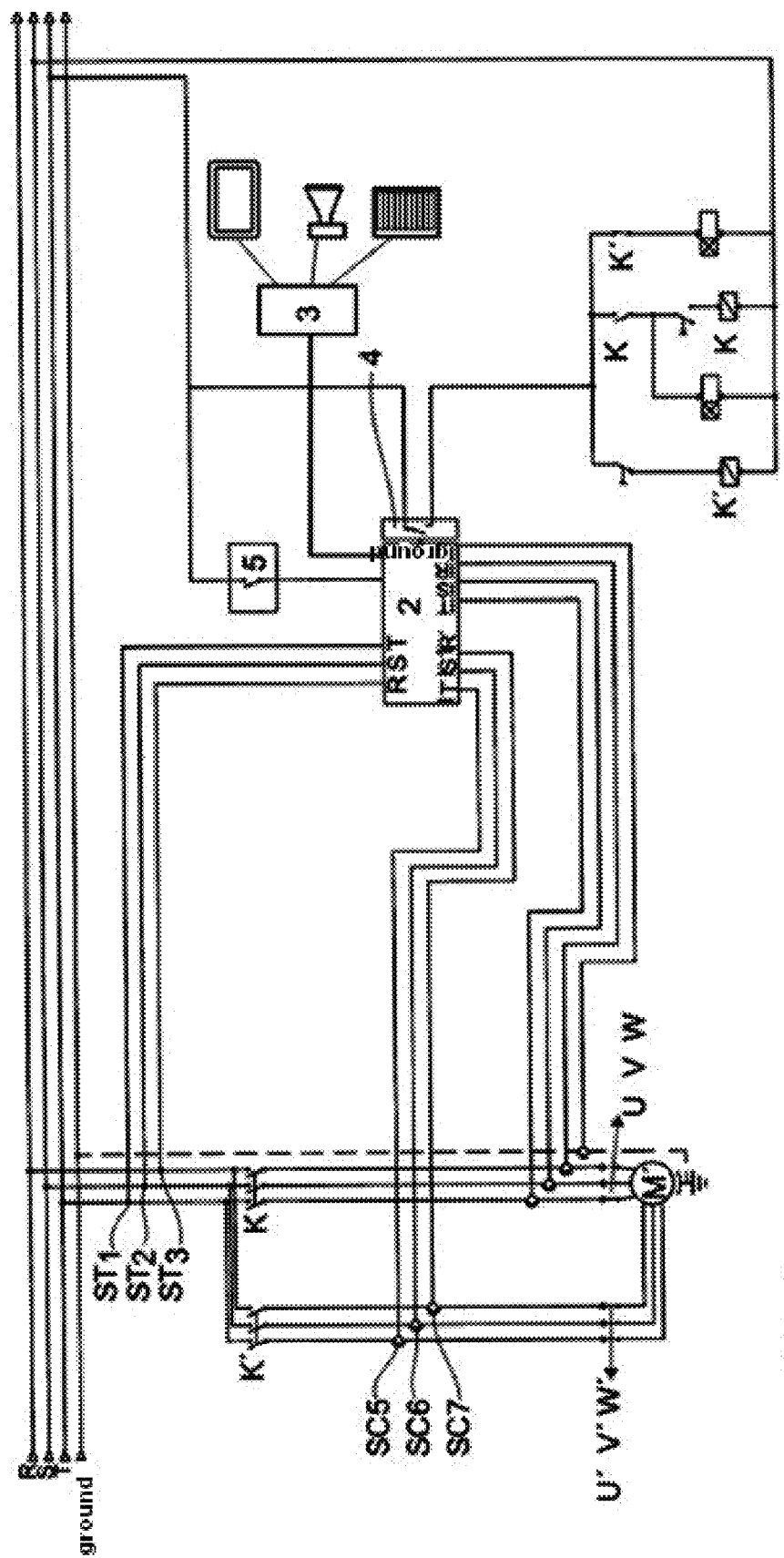
FIG. 1B shows a general connection scheme of an alternative embodiment of the protection system disclosed by the present invention, for a motor with six electric doors, with "divided start", and its corresponding maneuver element.

In an alternate embodiment, as shown in FIG. 1B, the system of the present disclosure may also be used to monitor M' three-phase electric motors that have six electric doors, as the motors that allow start by the "triangle-star" method or the "divided start" method (FIG. 1B shows an M' motor that can be started by the "divided start" method). Experts in the art will realize that, within the parameters of the present disclosure can be applied to any kind of electric motor, notwithstanding the required adaptations due to the number of existing electric doors.

More specifically, and according to FIG. 1B, the M' motor has six electric doors U, V, W, U', V', W', which are intermediated by the contactors K, K'. In an equivalent way, tension sensors $ST_{1-3}$ are placed between the electric supply (R, S, T, Earth) and the contactors K, K', while current sensors $SC_{1-7}$ are placed between contactors K, K' and the electric doors U, V, W, U', V', W'.

Clearly, in this embodiment, the six electric currents $I_R$, $I_S$, $I_T$ and $I_{R'}$, $I_{S'}$, $I_{T'}$ that refer to each electric door of the motor, should be analyzed. By a previous configuration, the system is informed of the number of electric currents to be analyzed.

Accordingly, all the analyses remain unchanged, but we should observe that, in the case of analysis of six electric currents, the lack of phase will be analyzed simultaneously between currents $I_R$, $I_S$, $I_T$ and $I_{R'}$, $I_{S'}$, $I_{T'}$, and the imbalance will be calculated between currents $I_R$, $I_S$, $I_T$ and between currents $I_{R'}$, $I_{S'}$, $I_{T'}$. This way, all the analyses will be made simultaneously for each set of three currents.

In order to summarize the different forms of operation of the system of the present invention, we include Table 1 below, which shows the tests made in the motor, the variables employed in the respective tests and the operation of the system in the case of discrepancy between the variable, or the characteristic calculated from it.

TABLE 1

| Analysis | Object | Calculation | Operation |
|---|---|---|---|
| Start (FIG. 4 - object 3) | Start currents $I_R$, $I_S$ and $I_T$ ($I_{R'}$, $I_{S'}$, $I_{T'}$) | Compares start $I_R$, $I_S$ and $I_T$ ($I_{R'}$, $I_{S'}$, $I_{T'}$) with locked rotor current ($I\_max\_part$) | Compares each current with the limit given by locked rotor current - interrupts start of the motor (indication of locked rotor) |
| Imbalance (FIG. 5 - object 5) | $I_R$, $I_S$ and $I_T$ ($I_{R'}$, $I_{S'}$, $I_{T'}$) | $I_R \approx I_S \approx I_T$ as per IEC 34-1 (and $I_{R'} \approx I_{S'} \approx I_{T'}$) | Detects an imbalance between the individual currents of each phase - turns off the motor if the difference is higher than the set limit. |
| Current fluctuation (FIG. 6 - object 4) | $I_R$, $I_S$ and $I_T$ ($I_{R'}$, $I_{S'}$, $I_{T'}$) T | Calculates $\Delta i / \Delta t$ and compares them with a given value | Calculates variation of each current according to time - turns off the motor if current increases at a higher rate than determined limit (indication of a possible severe anomaly of the electric supply or the electric motor, such as rotor locked, low insulation, etc.). |
| Lack of phase (FIG. 7 - object 1) | $I_R$, $I_S$ and $I_T$ ($I_{R'}$, $I_{S'}$, $I_{T'}$) | Detects the existence of current in the phases $I_R \neq 0$; $I_S \neq 0$; $I_T \neq 0$ (and $I_{R'} \neq 0$; $I_{S'} \neq 0$; $I_{T'} \neq 0$) | Determines the existence of current in each phase - turns off the motor if there is lack of current in just one phase (the lack of current in one phase indicates the lack of phase). |
| Over current (FIG. 8 - object 2) | $I_R$, $I_S$ and $I_T$ ($I_{R'}$, $I_{S'}$, $I_{T'}$) | Compares $I_R$, $I_S$ and $I_T$ ($I_{R'}$, $I_{S'}$, $I_{T'}$) with a limit current: $I_R >$ $I\_opr\_max$; $I_S >$ $I\_opr\_max$; $I_T >$ $I\_opr\_max$, (or: $I_{R'} > I\_opr\_max$; $I_{S'} >$ $I\_opr\_max$; $I_{T'} >$ $I\_opr\_max$) | Compares each current with a limit value - turns off motor if any current is higher than limit (protection against over current in any phase) |
| Mechanical torque (FIG. 14 - object 2) | $I_R$, $I_S$ and $I_T$ $U_R$, $U_S$ and $U_T$ ($I_{R'}$, $I_{S'}$, $I_{T'}$) | Calculates the torque of the motor from $I_R$, $I_S$ and $I_T$ ($I_{R'}$, $I_{S'}$, $I_{T'}$) | Calculates the mechanical torque from the electric current - shows the torque value on the display. |
| Harmonic distortion (FIG. 9 - object 7) | $I_R$, $I_S$ and $I_T$ $U_R$, $U_S$ and $U_T$ ($I_{R'}$, $I_{S'}$, $I_{T'}$) | Decomposition of harmonic signals by Fourier series + comparison with the class of motor | Decomposes harmonic signals by Fourier series and calculates immunity rate or level of harmonic tension admissible to the motor according to IEC parameters - turns off motor if level of harmonic tension is higher than the limit established for the class of motor. |
| Power factor (FIG. 10 - object 6) | $I_R$, $I_S$ and $I_T$ $U_R$, $U_S$ and $U_T$ ($I_{R'}$, $I_{S'}$, $I_{T'}$) | Calculates $\cos \phi$ and power factor + compares FP with minimum and maximum limits | Compares FP with minimum and maximum limits - turns off motor if FT is out of the allowed operation interval |
| Motor damage (FIG. 13 - object 8) | $I_{Earth}$ | Measures escape current ($I\_earth\_measure$) in line $L_{Earth}$ and compares it with a previously defined value | Compares escape current with given value - turns off the motor if escape current is higher than determined value (indicates shortening motor life, wear in the insulating resin in the stator, high humidity in winding, etc.) |
| Undue start (FIGS. 11 and 12) | $I_R$, $I_S$ and $I_T$ ($I_{R'}$, $I_{S'}$, $I_{T'}$) | Detects existence of current in phases $I_R \neq 0$; $I_S \neq 0$; $I_T \neq 0$ (or $I_{R'} \neq 0$; $I_{S'} \neq 0$; $I_{T'} \neq 0$) | Identifies undue start of the motor during motor turnoff process - registers this failure |

Finally, the present disclosure also includes a protection method for an electric motor M from a number of tension sensors $ST_{1-n}$ and current sensors $SC_{1-n}$, particularly Hall effect current sensors, the tension sensors being located upstream from the contactor K and the current sensors being located downstream from the contactor K. Thus, the method includes initially the following steps:

A1. to detect the feeding tension $U_R$, $U_S$ and $U_T$ during the start procedure of the motor M, in each feeding phase R, S and T, and the feeding currents of the motor M in each feeding phase R, S and T, and to present the tensions and currents detected by a communication interface 3;

A2. to start the motor M; and

A3. to detect start currents $I_R$, $I_S$ and $I_T$ and compare said currents with blocked rotor current $I_{max\ part}$; if any start current is higher than the blocked rotor current, to turn off the motor.

After these steps of the start stage, the motor M begins effective operation, and the method begins to monitor the following new parameters:

B1. to identify an imbalance between the feeding phases R, S and T from the currents $I_R$, $I_S$ and $I_T$;

B2. to identify a current fluctuation $\Delta i/\Delta t$ from the currents $I_R$, $I_S$ and $I_T$ in relation to time T;

B3. to identify lack of phase in any one of the phases R, S or T, by the determination of a phase current $I_R$, $I_S$ and $I_T$ equal to zero;

B4. to identify an over current in any of the feeding phases R, S or T, by the comparison of each of the phase currents $I_R$, $I_S$ and $I_T$ with a limit value l_opr_max for the currents;

B5. to calculate the mechanical torque of the motor M from the currents $I_R$, $I_S$ and $I_T$ and the tensions $U_R$, $U_S$ and $U_T$, and present the value calculated for the torque;

B6. to identify a harmonic distortion in the feeding, from the currents $I_R$, $I_S$ and $I_T$ and the tensions $U_R$, $U_S$ and $U_T$;

B7. to identify a power factor out of operation standards by the calculation of cos φ and the power factor from the currents $I_R$, $I_S$ and $I_T$ and the tensions $U_R$, $U_S$ and $U_T$; and B8. to identify possible damage to the motor from the determination of the escape current l_earth_measured in line $L_{Earth}$.

When the operator wants to turn off the motor, or when any one of the monitoring steps of the motor operation indicates a failure that may damage the motor, the method of the present invention also includes the follow-up of said turnoff stage by the following steps:

C1. to detect the motor M turnoff command;

C2. to turn off the motor relay 4;

C3. to identify an undue actuation of the motor by the determination of a phase current $I_R$, $I_S$ and $I_T$ different from zero; if any of the phase currents $I_R$, $I_S$ and $I_T$ is different from zero, set off an alarm and register said failure.

It is important to highlight that, as in the configuration indicated in FIG. 1B, the same equivalence of procedures can be applied to the methods disclosed above. So, in a motor M' provided with six electric doors, instead of testing just the currents $I_R$, $I_S$ and $I_T$, all currents $I_R$, $I_S$, $I_T$ and $I_{R'}$, $I_{S'}$, $I_{T'}$ are tested.

The system of the present disclosure, provides full control of the electric motor, preserving the motor life and safeguarding other devices that may be connected to the motor, such as a compressor in a refrigeration system.

What is claimed is:

1. Electronic system to protect electric motors, wherein the motor (M, M') is a three-phase electric motor, connected to a compressor of a refrigeration system, wherein the system comprises:

a plurality of sensors ($ST_{1-n}$, $SC_{1-n}$), being tension sensors ($ST_{1-n}$) located before contactor (K, K') and current sensors ($SC_{1-n}$) are Hall-effect type sensors located between the contactor (K, K') and feeding terminals (U, V, W, U', V', W') of the motor (M, M');

a processor (2) to execute rules to evaluate currents and tensions measured in the motor (M, M') from readings made by the plurality of sensors ($ST_{1-n}$, $SC_{1-n}$);

a communication interface (3) connected to the processor (2) to present the results of the application of the rules; and an actuation interface (4), connected to the processor (2) that acts on the contactor (K, K');

wherein the rules comprise one or more from the group consisting of:

a1. detecting the feeding tension ($U_R$, $U_S$, $U_T$) during the procedure of motor (M, M') start in each of the feeding phases (R, S, T), and the motor (M, M') feeding currents in each feeding phase (R, S, T) and presenting the tensions and currents detected by the communication interface (3);

A2. starting the motor (M, M');

A3. detecting the start currents ($I_R$, $I_S$, $I_T$, $I_{R'}$, $I_{S'}$, $I_{T'}$) and comparing said currents with the blocked rotor current ($I_{max\ part}$); if any start current is higher than the blocked rotor current, turning off the motor;

B1. identifying an imbalance between the feeding phases (R, S, T) from the currents ($I_R$, $I_S$, $I_T$, $I_{R'}$, $I_{S'}$, $I_{T'}$);

B2. identifying a current fluctuation ($\Delta i/\Delta t$) from the currents ($I_R$, $I_S$, $I_T$, $I_{R'}$, $I_{S'}$, $I_{T'}$) in relation to time (T);

B3. identifying lack of phase in any of the phases (R, S, T) from the feeding, by determining a phase current ($I_R$, $I_S$, $I_T$, $I_{R'}$, $I_{S'}$, $I_{T'}$) equal to zero;

B4. identifying an over current in any of the feeding phases (R, S, T) by comparing each of the phase currents ($I_R$, $I_S$, $I_T$, $I_{R'}$, $I_{S'}$, $I_{T'}$) with a limit value (1_opr_max) for the currents;

B5. calculating the mechanical torque of the motor (M, M') from the currents ($I_R$, $I_S$, $I_T$, $I_{R'}$, $I_{S'}$, $I_{T'}$) and the tensions ($U_R$, $U_S$, $U_T$) and presenting the value calculated for the torque;

B6. identifying a harmonic distortion in feeding, from the currents ($I_R$, $I_S$, $I_T$, $I_{R'}$, $I_{S'}$, $I_{T'}$) and the tensions ($U_R$, $U_S$, $U_T$);

B7. identifying a power factor out of operation standards by calculating cos φ and the power factor (FP) from the currents ($I_R$, $I_S$, $I_T$, $I_{R'}$, $I_{S'}$, $I_{T'}$) and the tensions ($U_R$, $U_S$, $U_T$); and B8. identifying possible damage to the motor from the determination of the escape current (l_earth_measured) in the line $L_{Earth}$, if, in steps B, any at calculated and/or measured parameter is out of a corresponding range of operation and/or higher or lower than a given limit, the motor (M, M') is turned off;

C1. identifying a motor (M, M') turnoff command;

C2. turning off the motor relay/interface (4);

C3. identifying an undue actuation of the motor by determining a phase current ($I_R$, $I_S$, $I_T$, $I_{R'}$, $I_{S'}$, $I_{T'}$) different from zero; if any of the phase currents ($I_R$, $I_S$, $I_T$, $I_{R'}$, $I_{S'}$, $I_{T'}$) is different from zero, to set off an alarm and register said failure.

2. Method to protect electric motors, particularly for three-phase electric motors, comprising the application of a plurality of rules, as rules related to motor start, rules related to motor operation and rules related to motor turnoff, wherein the rules regarding motor start comprise the following steps:

a1. detecting the feeding tension ($U_R$, $U_S$, $U_T$) during the procedure of motor start (M, M') in each one of the feeding phases (R, S, T), and the motor (M, M') feeding currents in each feeding phase (R, S, T) and to present the tensions and currents detected by the communication interface (3);

A2. starting the motor (M, M');

A3. detecting the start currents ($I_R$, $I_S$, $I_T$, $I_{R'}$, $I_{S'}$, $I_{T'}$) and compare said currents with the blocked rotor current ($I_{max\ part}$); if any start current is higher than the blocked rotor current, to turn off the motor.

3. Method to protect electric motors, particularly for three-phase electric motors, comprising the application of a plurality of rules, as rules related to motor start, rules related to motor operation and rules related to motor turnoff, wherein the rules regarding motor turnoff comprise the following steps:
   C1. detecting a motor (M, M') turnoff command;
   C2. turning off the motor relay/interface (4);
   C3. identifying an undue actuation of the motor by determining a phase current $I_R$, $I_S$, $I_T$, $I_{R'}$, $I_{S'}$, $I_{T'}$) different from zero; if any of the phase currents ($I_R$, $I_S$, $I_T$, $I_{R'}$, $I_{S'}$, $I_{T'}$) is different from zero, to turn off the motor and register said failure.

4. Method to protect electric motors, particularly for three-phase electric motors, comprising the application of a plurality of rules, as rules related to motor start, rules related to motor operation and rules related to motor turnoff, wherein the rules regarding the operation of the motor comprise at least one of the following steps:
   B1. identifying an imbalance between the feeding phases (R, S, T) from the currents ($I_R$, $I_S$, $I_T$, $I_{R'}$, $I_{S'}$, $I_{T'}$);
   B2. identifying a current fluctuation ($\Delta i/\Delta t$) from the currents ($I_R$, $I_S$, $I_T$, $I_{R'}$, $I_{S'}$, $I_{T'}$) in relation to time (T);
   B3. identifying lack of phase in any of the phases (R, S, T) from the feeding by determining a phase current ($I_R$, $I_S$, $I_T$, $I_{R'}$, $I_{S'}$, $I_{T'}$) equal to zero;
   B4. identifying an over current in any of the feeding phases (R, S, T) by comparing each of the phase currents ($I_R$, $I_S$, $I_T$, $I_{R'}$, $I_{S'}$, $I_{T'}$) with a limit value (l_opr_max) for the currents;
   B5. calculating the mechanical torque of the motor (M, M') from the currents ($I_R$, $I_S$, $I_T$, $I_{R'}$, $I_{S'}$, $I_{T'}$) and the tensions ($U_R$, $U_S$, $U_T$) and to present the value calculated for the torque;
   B6. identifying a harmonic distortion in feeding, from the currents ($I_R$, $I_S$, $I_T$, $I_{R'}$, $I_{S'}$, $I_{T'}$) and the tensions ($U_R$, $U_S$, $U_T$);
   B7. identifying a power factor out of operation standards by calculating cos φ and the power factor (FP) from the currents ($I_R$, $I_S$, $I_T$, $I_{R'}$, $I_{S'}$, $I_{T'}$) and the tensions ($U_R$, $U_S$, $U_T$); and
   B8. identifying possible damage to the motor from the determination of the escape current (l_earth_measured) in line $L_{Earth}$; if any calculated and/or measured parameter is out of a corresponding operation range and/or above or below a given limit, the motor (M, M') is turned off.

5. Method, according to claim 4, wherein at least one among the rules regarding the operation of the motor may be applied in any order of execution, even simultaneously.

* * * * *